Figure 1:
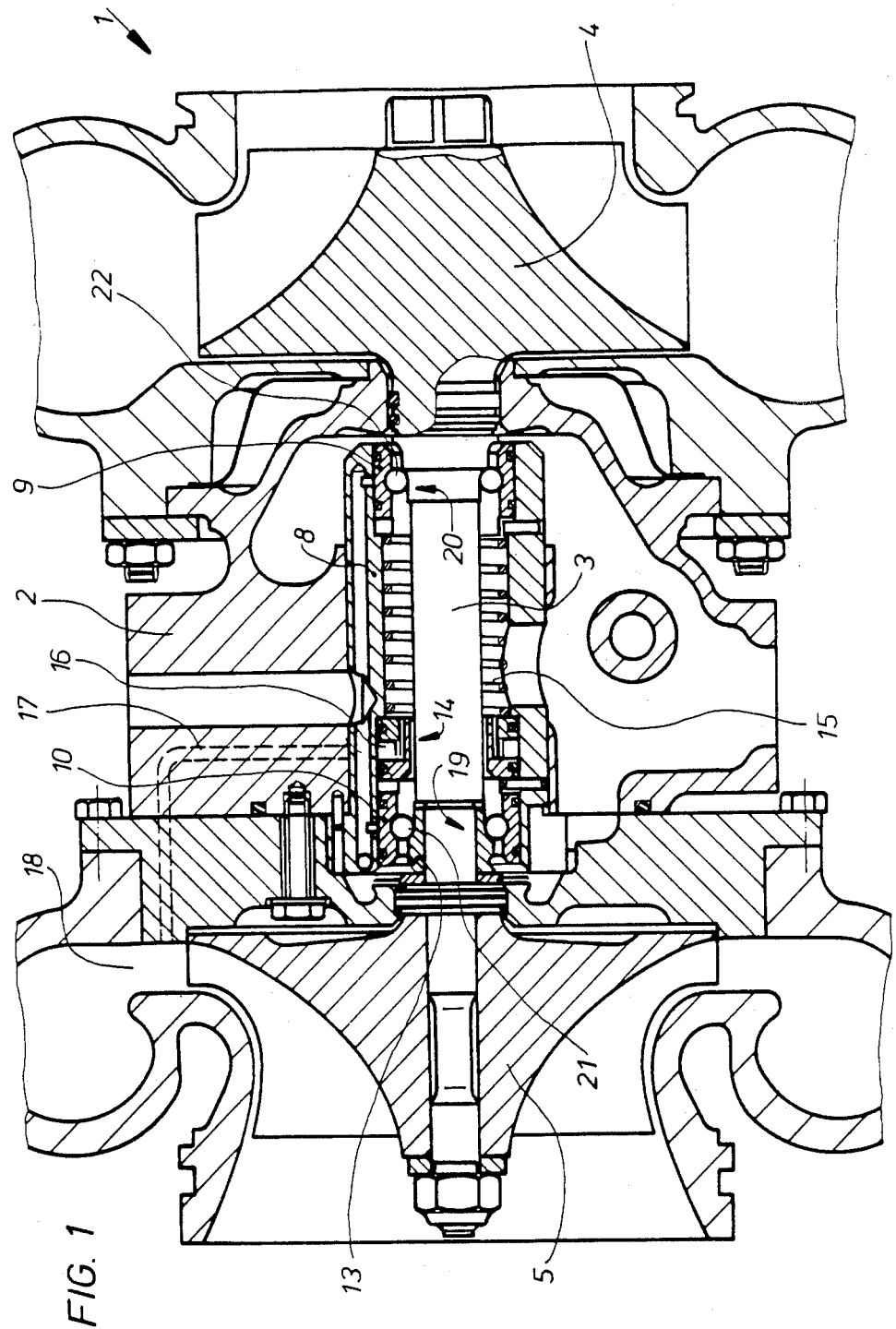

United States Patent [19]
Ruetz

[11] Patent Number: 4,808,091
[45] Date of Patent: Feb. 28, 1989

[54] BEARING SUPPORT OF THE SHAFT OF AN EXHAUST GAS TUBINE

[75] Inventor: Georg Ruetz, Immenstaad, Fed. Rep. of Germany

[73] Assignee: MTU-Motoren-und Turbinen-Union Friedrichshafen GmbH, Friedrichshafen, Fed. Rep. of Germany

[21] Appl. No.: 933,868

[22] Filed: Nov. 24, 1986

[30] Foreign Application Priority Data

Nov. 26, 1985 [DE] Fed. Rep. of Germany ....... 3541702

[51] Int. Cl.$^4$ .............................................. F04B 17/00
[52] U.S. Cl. ..................................... 417/407; 384/556
[58] Field of Search ....................... 417/405, 406, 407; 384/517, 518, 556, 563

[56] References Cited

U.S. PATENT DOCUMENTS

| | | | |
|---|---|---|---|
| 2,973,136 | 2/1961 | Greenwald | 417/407 |
| 3,017,230 | 1/1962 | Meermans | 417/407 |
| 3,132,594 | 5/1964 | Shiley et al. | 417/407 |
| 3,176,620 | 4/1965 | Shiley | 417/407 |
| 3,313,581 | 4/1967 | Kusakabe | 384/517 |
| 3,574,424 | 4/1971 | Hagemeister | 384/517 |
| 4,227,755 | 10/1986 | Lundberg | 384/518 |

FOREIGN PATENT DOCUMENTS 2107002 4/1983 United Kingdom ................ 384/517

Primary Examiner—Louis J. Casaregola
Assistant Examiner—Timothy S. Thorpe
Attorney, Agent, or Firm—Barnes & Thornburg

[57] ABSTRACT

A bearing support of the rotor of an exhaust gas turbocharger with two inwardly disposed roller bearings in which, to assure a long length of life of the bearing, the roller members of the bearings are pressed constantly against their races so that they roll off along the same in a defined manner and no wear occurs as a result of sliding or load changes. The abutment forces which act at the bearings are produced by one or several pneumatic cylinders whose pressure spaces are preferably in connection with a gas space of the compressor. As the magnitude of the charging pressure of the compressor is dependent on the rotational speed, the abutment forces are also variable with the rotational speed. The piston surfaces of the pressure cylinders are so matched that at low rotational speeds as low as possible a bearing friction loss results whereas the abutment forces are still sufficiently high to assure a damage-free bearing operation. As a result of the charging pressure rising with increasing rotational speeds, the necessary considerably higher abutment forces are also available at higher rotational speeds.

14 Claims, 2 Drawing Sheets

BEARING SUPPORT OF THE SHAFT OF AN EXHAUST GAS TUBINE

The present invention relates to a bearing support of the shaft of an exhaust gas turbocharger in two roller bearings arranged between the compressor and the turbine and provided with axially acting elastic means pressing the races of the bearing rings which cooperate in a roller bearing and are mutually axially displaceable, against the roller members of the roller bearings, as disclosed, for example, in the application No. WO80/02585.

In the aforementioned application No. WO80/02585, an exhaust gas turbocharger is shown, inter alia, whose shaft is supported in the housing by two inwardly disposed bearings, i.e., arranged between the compressor and the turbine. A pressure is exerted against an outer bearing ring axially displaceable with respect to the housing by an axially acting prestressed spring supported at the opposite bearing, and therewith the roller members of the bearing are pressed against the outer race in the bearing ring and against the race machined into the shaft. However, as the shaft is also axially displaceable relative to the housing, and the inner race of the further bearing is also machined into the shaft, and as the outer bearing race of this bearing is axially fixed in the housing, the roller members of this bearing are also pressed by the prestress of the spring also against their races.

According to the DE-AS No. 10 88 769, the bearing races or ball bearings of a blower or fan device driven by a turbine wheel are prestressed in a similar manner.

A constant force is produced by the spring in the bearings under all operating conditions, and, as a result thereof, bearing play is avoided. In particular at high rotational speeds as occur, for example, with exhaust gas turbochargers, it is prerequisite for a long length of life that the roller members abut at all times without play or clearance at their races and roll off along the same. However, the friction loss in the bearing resulting from the abutment force is disadvantageous which is unnecessarily high, especially at low rotational speeds. This is due to the fact that the prestress of the spring is so adjusted that sufficiently high abutment forces are produced at high rotational speeds which are effective also at lower rotational speeds whereas they need not be nearly as high at such lower rotational speeds.

The present invention is concerned with the task to provide an installation, by means of which the bearing friction losses can be reduced, and nonetheless a correct bearing operation and therewith a high length of life of the bearing is assured.

The underlying problems are solved according to the present invention in that for purposes of producing the abutment pressures, pneumatic cylinders are coupled with axially displaceable bearing rings, and the pressure space of the pneumatic cylinder is in communication with a gas space of the compressor. A reduction of the bearing friction losses is achieved in that the abutment forces acting in the bearings are variably adjustable with the rotational speed. For that purpose, for example, the gas space of the compressor is connected with the pressure space of a pneumatic cylinder which acts at the bearing rings. At low rotational speeds, the charging pressure and therewith the force action of the pneumatic cylinder is correspondingly small. With increasing rotational speed, the charging pressure also increases and therewith the force action on the bearing rings. In addition to the cylinder, according to a further feature of the present invention, a spring may also be connected in parallel or in series. This spring is selected exactly so stiff that it produces a certain minimum abutment force at the bearings at lower rotational speeds which, however, is considerably lower than the forces necessary at high rotational speeds.

It is advantageous that by reason of the reduction of the friction losses in the lower rotational speed range, a corresponding higher energy is also available in this range for the conversion into useful energy, for example, for the supercharger acceleration.

Figure 2:
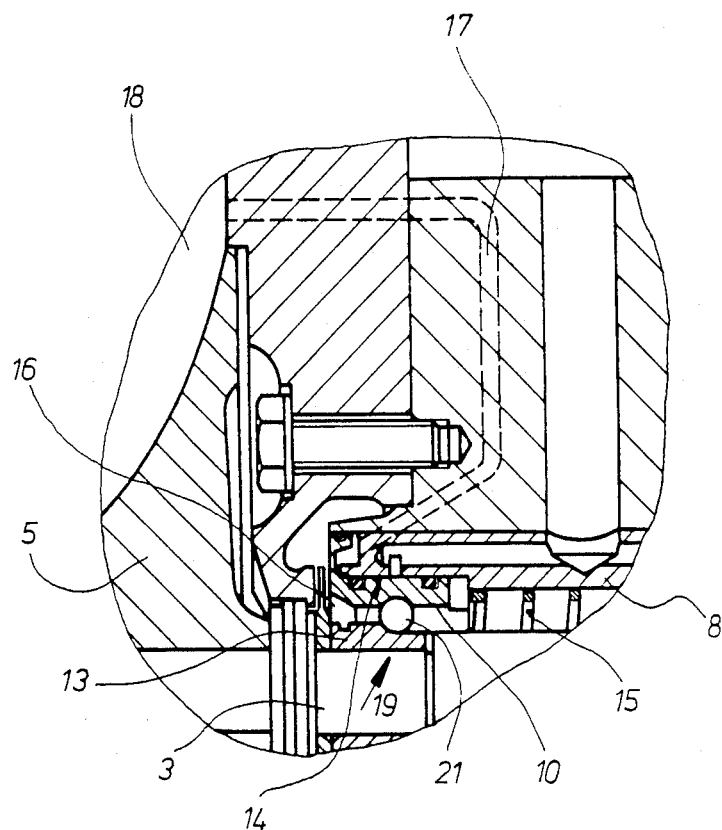

These and other objects, features and advantages of the present invention will become more apparent from the following description when taken in connection with the accompanying drawing which shows, for purposes of illustration only, one embodiment in accordance with the present invention, and wherein:

FIG. 1 is a cross-sectional view of an exhaust gas turbocharger with a pneumatic cylinder acting at the roller bearings in accordance with the present invention; and FIG. 2 is a partial cross-sectional view, on an enlarged scale, of a detail of an exhaust gas turbocharger corresponding to that of FIG. 1, with piston surfaces of a pneumatic cylinder formed-on at a bearing ring and at housing parts.

Referring now to the drawing wherein like reference numerals are used throughout the two views to designate like parts, in the exhaust gas turbocharger generally designated by reference numeral 1 which is illustrated in cross-sectional view in FIG. 1, the shaft 3, at the ends of which are secured a turbine rotor 4 and a compressor rotor 5, is supported in a roller bearing generally designated by reference numeral 19 on the side of the compressor and in a roller bearing generally designated by reference numeral 20 on the turbine side which are equipped with ball-shaped roller members 21 and 22. The outer bearing rings 9 and 10 of the ball bearings are supported secured against rotation in a tubularly shaped bearing support 8 which, in its turn, is secured in the bearing housing 2 of the exhaust gas turbocharger 1. The roller members 22 of the inclined ball bearing 20 on the side of the turbine are located inwardly on a race machined into the shaft 3. The roller bearing 19 on the compressor side includes an inner bearing ring 13 which is connected with the shaft 3. For the lubrication of the ball bearings and for building up a damping film between the walls of the bearing support 8 and the outer bearing rings 9 and 10, oil bores are provided in the bearing support 8 and in the bearing housing 2. Furthermore, a bore 17 is provided which represents a connection between the gas space 18 of the compressor and the pressure space 16 of a pneumatic cylinder generally designated by reference numeral 14 which is disposed between an end face of the outer bearing ring 10 and an inner shoulder of the bearing support 8.

The pressure space 16 of the pneumatic cylinder could also be connected with the gas space of the turbine which, however, is not illustrated. The pneumatic cylinder 14 includes ring-shaped cylinder covers acting as piston surfaces which adjoin the bearing support 8 and are sealed off with respect to the latter. A weak spring 15 is located between the outer bearing ring 9 of the roller bearing 20 on the turbine side and the cylinder cover of the pneumatic cylinder 14 facing the same.

FIG. 2 illustrates a partial cross section corresponding to FIG. 1 of an exhaust gas turbocharger 1 within the area of the roller bearing 19 on the compressor side. The piston surfaces of the pneumatic cylinder 14 are formed-on in this case at the outer bearing ring 10 and at the bearing support 8, as a result of which the number of assembly parts is reduced in an advantageous manner. For maintaining a minimum abutment force at low rotational speeds, the spring 15 is supported at the bearing ring on the compressor side and on the turbine side. The force produced from the piston surface and the pressure in the pneumatic cylinder acts in an axial direction on the bearing ring 10, as a result of which the roller members 21 are pressed against their race in the inner bearing ring 13. As the bearing ring 13 is connected with the shaft 3, whereas the shaft 3 is axially displaceably supported, an axial displacement of the shaft takes place until a play is also compensated for in the roller bearing 20 on the turbine side, and the roller members 22 abut in their races at the bearing ring 9 and the shaft 3. In order to avoid superfluous bearing friction losses, it is necessary to change the abutment force with the rotational speed. This means at low rotational speed, it is desired that the abutment forces are considerably lower than at high rotational speeds. As the charging pressure increases with increasing rotational speed, and the charging pressure is present in the pneumatic cylinder 14, a small force action of the pneumatic cylinder results at low rotational speeds and a considerably higher force action at high rotational speed. Thus, a higher energy is available in particular at low rotational speeds by reason of the reduced bearing friction losses which can be used, for example, with the acceleration. A spring 15 which is preferably connected in parallel with the pneumatic cylinder is so selected that the abutment force does not fall below a certain minimum abutment force, and already during the starting of the exhaust gas turbocharger 1, the roller members are pressed against their races.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A bearing support of a shaft of an exhaust gas turbocharger in two roller bearing means arranged between its compressor and turbine, and in which the roller bearing means include bearing ring means forming race means, comprising axially acting elastic means pressing the race means of the bearing ring means which cooperate in a given roller bearing means and are axially displaceable relative to one another, against the roller members of the roller bearing means including pneumatic cylinder means operatively connected with the axially displaceable bearing ring means, the pneumatic cylinder means being provided with a pressure space operatively connected with a gas space of one of compressor or turbine to provide bearing preload as a function of the pressure of the compressor or turbine.

2. A bearing support according to claim 1, wherein the two roller bearing means are disposed between the turbine and the compressor.

3. A bearing support according to claim 1, wherein the pressure space of the pneumatic cylinder means is in communication with the gas space of the compressor.

4. A bearing support according to claim 1, further comprising bearing support means receiving the outer bearing ring means, an axial relative displacement being permitted between the bearing support means and the shaft carrying the inner bearing ring means, the pneumatic cylinder means being supported at the bearing support means and being operatively connected with one outer bearing ring means while the other outer bearing ring means and the inner bearing ring means are axially supported at the bearing support means, respectively, at the shaft.

5. A bearing support according to claim 4, wherein the pneumatic cylinder means includes substantially circularly shaped piston ring surfaces and is located about the shaft.

6. A bearing support according to claim 5, wherein the piston surfaces of the pneumatic cylinder means are formed-on at an outer bearing ring means and the bearing support means.

7. A bearing support according to claim 1, further comprising a spring operatively connected with the pneumatic cylinder means for producing sufficient abutment forces at low rotational speeds of the exhaust gas turbocharger.

8. A bearing support according to claim 7, wherein said spring is operatively connected in parallel with the pneumatic cylinder means.

9. A bearing support according to claim 7, wherein said spring is operatively connected in series with the pneumatic cylinder means.

10. A bearing support according to claim 1, wherein the pneumatic cylinder means includes substantially circularly shaped piston ring surfaces and is located about the shaft.

11. A bearing support according to claim 10, further comprising a spring operatively connected with the pneumatic cylinder means for producing sufficient abutment forces at low rotational speeds of the exhaust gas turbocharger.

12. A bearing support according to claim 11, wherein said spring is operatively connected in parallel with the pneumatic cylinder means.

13. A bearing support according to claim 11, wherein said spring is operatively connected in series with the pneumatic cylinder means.

14. A bearing support according to claim 11, further comprising bearing support means receiving the outer bearing ring means, an axial relative displacement being permitted between the bearing support means and the shaft carrying the inner bearing ring means, the pneumatic cylinder means being supported at the bearing support means and being operatively connected with one outer bearing ring means while the other outer bearing ring means and the inner bearing ring means are axially supported at the bearing support means, respectively, at the shaft.

* * * * *